US012706834B2

(12) United States Patent
Toledo et al.

(10) Patent No.: US 12,706,834 B2
(45) Date of Patent: Aug. 11, 2026

(54) ADAPTIVE ENDPOINT-TO-ENDPOINT DATA PATH SELECTION FOR DATA CENTERS

(71) Applicant: International Business Machines Corporation, Armonk, NY (US)

(72) Inventors: Kfir Menachem Toledo, Haifa (IL); Liran Schour, Yodfat (IL); Mohamed Mahameed, Umm al Fahm (IL); Eran Gampel, Tel aviv (IL); Etai Lev Ran, Nofit (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 99 days.

(21) Appl. No.: 18/433,726

(22) Filed: Feb. 6, 2024

(65) Prior Publication Data

US 2025/0254119 A1 Aug. 7, 2025

(51) Int. Cl.

*H04L 45/12* (2022.01)
*H04L 12/14* (2024.01)
*H04L 43/50* (2022.01)
*H04L 45/00* (2022.01)

(52) U.S. Cl.

CPC ........ *H04L 45/123* (2013.01); *H04L 12/1432* (2013.01); *H04L 43/50* (2013.01); *H04L 45/566* (2013.01)

(58) Field of Classification Search

CPC ... H04L 45/123; H04L 12/1432; H04L 43/50; H04L 45/566

See application file for complete search history.

(56) References Cited

U.S. PATENT DOCUMENTS 8,111,649 B1 * 2/2012 Agarwall ................ H04L 12/00 370/328
10,187,309 B1 1/2019 Vincent et al.
10,200,279 B1 * 2/2019 Aljaedi ................ H04L 41/342

(Continued)

FOREIGN PATENT DOCUMENTS

EP 3176981 A1 * 6/2017 ............ H04L 69/22

OTHER PUBLICATIONS

Jouet et al., OTCP: SDN-Managed Congestion Control for Data Center Networks, Apr. 25-29, 2016.

(Continued)

*Primary Examiner* — Rachel J Hackenberg
(74) *Attorney, Agent, or Firm* — Steven M. Bouknight

(57) ABSTRACT

An embodiment selects, using performance data of a plurality of paths, a first path, each path comprising a data communication path from a first network endpoint through a subset of a plurality of network elements in a data communication network to a second network endpoint. An embodiment adjusts a packet header of a data packet, wherein a parameter setting in the adjusted data packet header causes a first network element in the data communication network to forward the adjusted data packet to a next network element in the data communication network along the first path. An embodiment sends the adjusted data packet, wherein the adjusted data packet causes a first subset of the plurality of network elements in the data communication network to forward the adjusted data packet to the second network endpoint along the first path.

20 Claims, 7 Drawing Sheets

(56) References Cited

U.S. PATENT DOCUMENTS

| | | | | |
|---|---|---|---|---|
| 10,225,193 | B2 | 3/2019 | Judge et al. | |
| 10,771,389 | B2 * | 9/2020 | Hira | H04L 47/115 |
| 2015/0146526 | A1 | 5/2015 | Kulkarni | |
| 2019/0036842 | A1 * | 1/2019 | Aranha | H04L 43/087 |
| 2020/0236052 | A1 | 7/2020 | Srinivasan et al. | |
| 2021/0409335 | A1 * | 12/2021 | Zhu | H04L 47/24 |
| 2022/0191142 | A1 * | 6/2022 | Mermoud | H04L 45/64 |

OTHER PUBLICATIONS

Perry et al., Fastpass: A Centralized "Zero-Queue" Datacenter Network, SIGCOMM'14, Aug. 17-22, 2014.

Perry et al., Flowtune: Flowlet Control for Datacenter Networks, 14th USENIX Symposium on Networked Systems Design and Implementation (NSDI '17), Mar. 27-29, 2017.

Shalev et al., A Cloud-Optimized Transport Protocol for Elastic and Scalable HPC, Oct. 21, 2020.

* cited by examiner

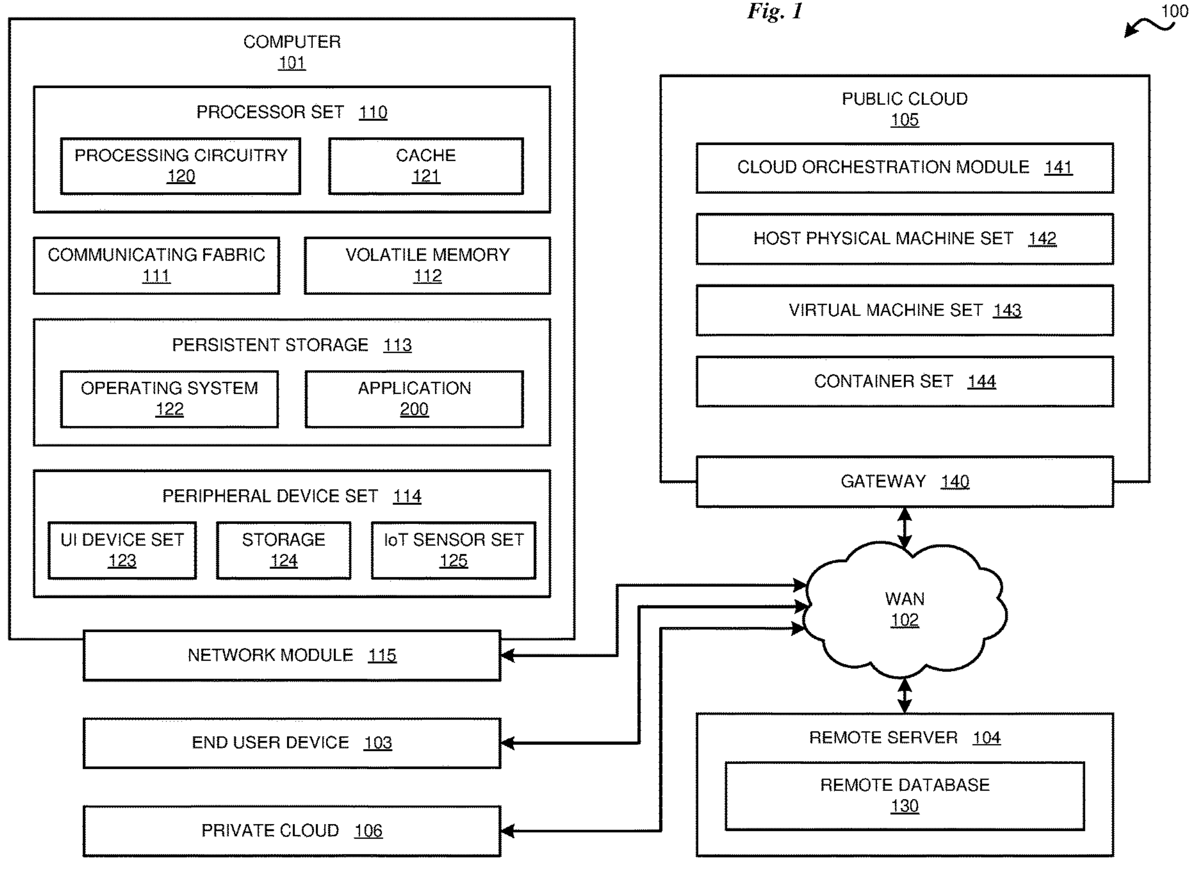

Fig. 1
100
COMPUTER
101
PROCESSOR SET 110
PROCESSING CIRCUITRY
120
CACHE
121
COMMUNICATING FABRIC
111
VOLATILE MEMORY
112
PERSISTENT STORAGE 113
OPERATING SYSTEM
122
APPLICATION
200
PERIPHERAL DEVICE SET 114
UI DEVICE SET
123
STORAGE
124
IoT SENSOR SET
125
NETWORK MODULE 115
END USER DEVICE 103
PRIVATE CLOUD 106
PUBLIC CLOUD
105
CLOUD ORCHESTRATION MODULE 141
HOST PHYSICAL MACHINE SET 142
VIRTUAL MACHINE SET 143
CONTAINER SET 144
GATEWAY 140
WAN
102
REMOTE SERVER 104
REMOTE DATABASE
130

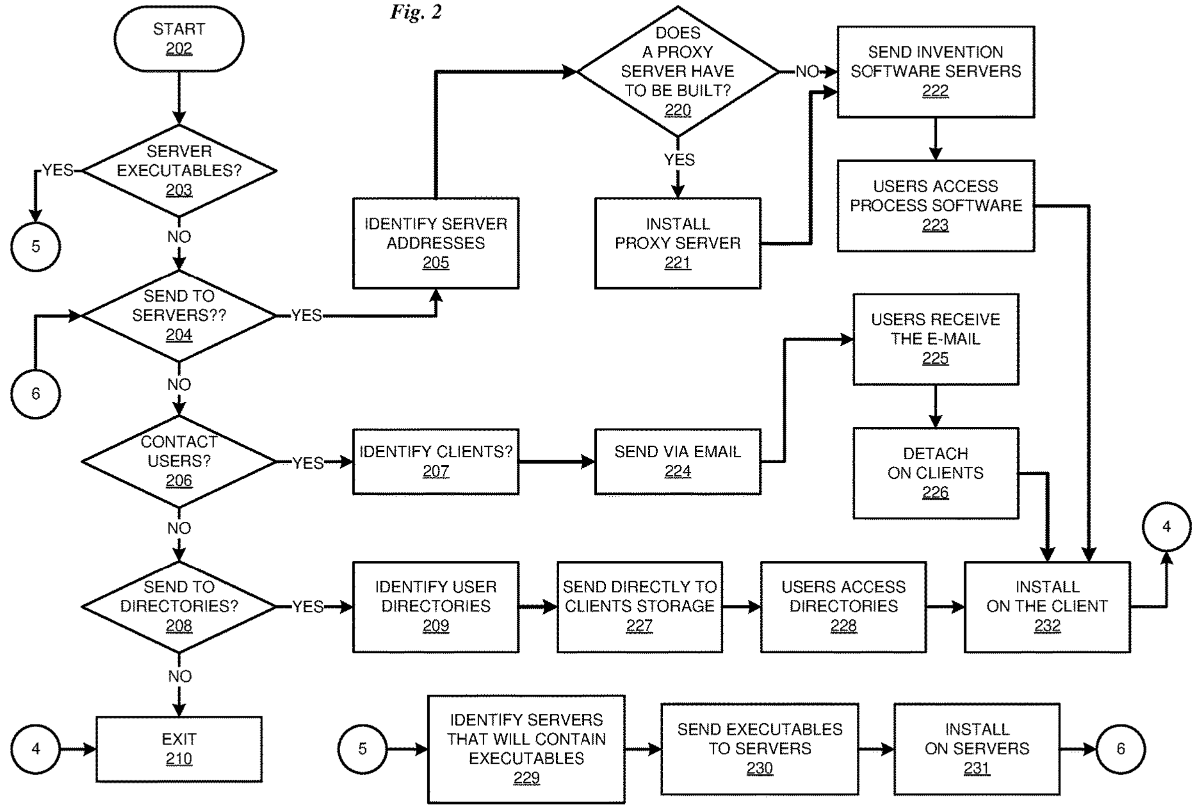

Fig. 2
START
202
SERVER EXECUTABLES?
203
YES
NO
5
SEND TO SERVERS??
204
YES
NO
6
CONTACT USERS?
206
YES
NO
SEND TO DIRECTORIES?
208
YES
NO
4
EXIT
210
IDENTIFY SERVER ADDRESSES
205
DOES A PROXY SERVER HAVE TO BE BUILT?
220
NO
YES
INSTALL PROXY SERVER
221
SEND INVENTION SOFTWARE SERVERS
222
USERS ACCESS PROCESS SOFTWARE
223
USERS RECEIVE THE E-MAIL
225
DETACH ON CLIENTS
226
IDENTIFY CLIENTS?
207
SEND VIA EMAIL
224
IDENTIFY USER DIRECTORIES
209
SEND DIRECTLY TO CLIENTS STORAGE
227
USERS ACCESS DIRECTORIES
228
INSTALL ON THE CLIENT
232
4
5
IDENTIFY SERVERS THAT WILL CONTAIN EXECUTABLES
229
SEND EXECUTABLES TO SERVERS
230
INSTALL ON SERVERS
231
6

| PATH | HOPS |
| --- | --- |
| 0 (PATH 410) | 451->461->471 |
| 1 | 451->461->472 |
| 2 | 451->461->473 |
| ... | ... |
| 26 (PATH 426) | 453->463->473 |

*Fig. 5*
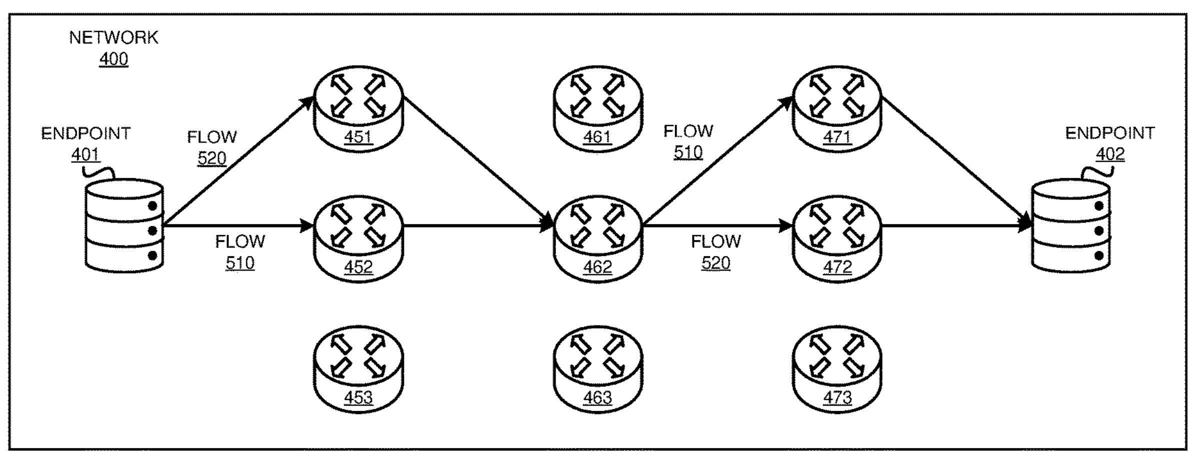
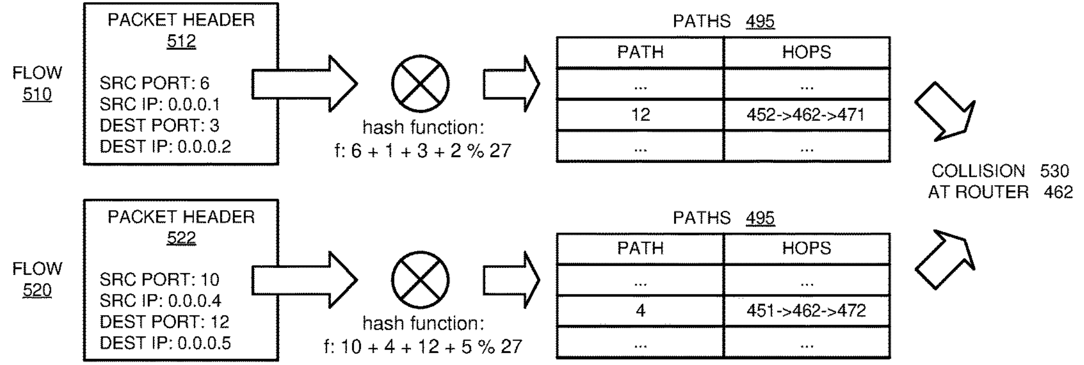

*Fig. 6*
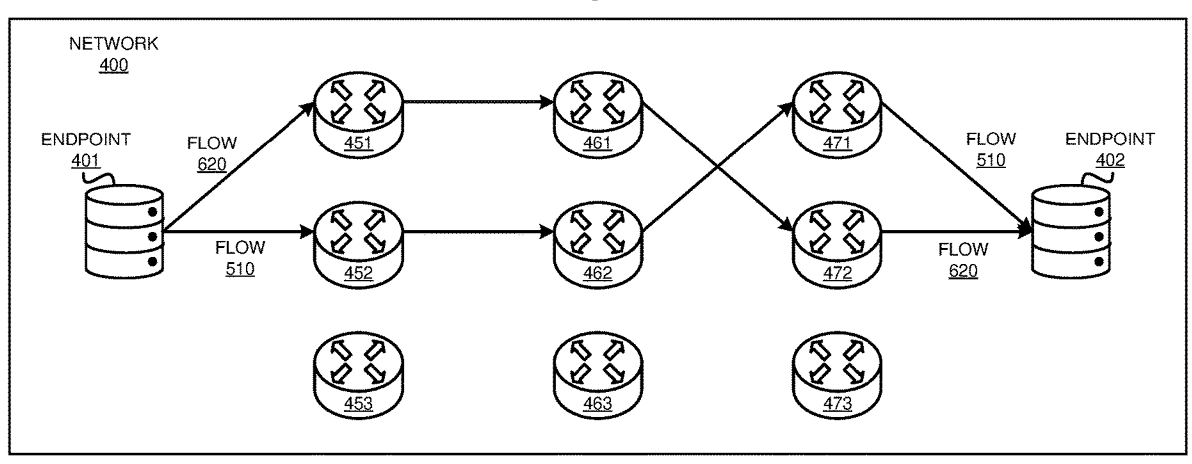
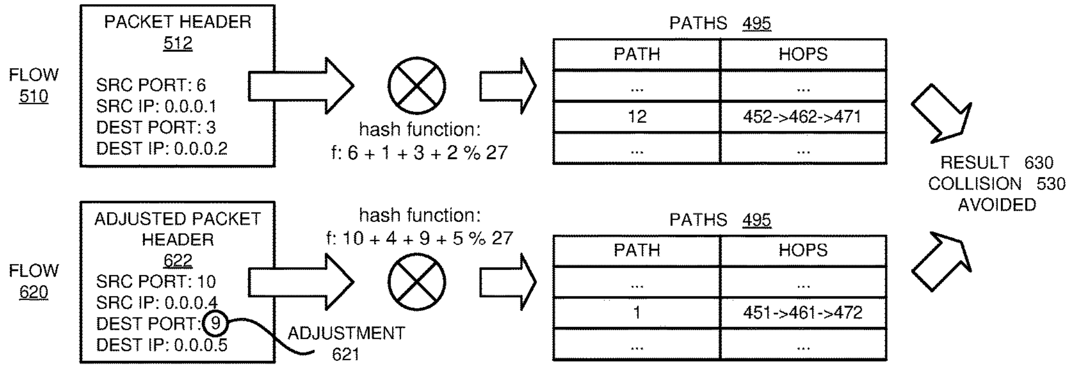

ADAPTIVE ENDPOINT-TO-ENDPOINT DATA PATH SELECTION FOR DATA CENTERS

BACKGROUND

The present invention relates generally to network management. More particularly, the present invention relates to a method, system, and computer program for adaptive endpoint-to-endpoint data path selection for data centers.

A data center typically includes a plurality of network elements in a data communication network. The network elements route traffic from one endpoint of the network to another endpoint of the network. Endpoints are data entrance or exit points of the network. For example, one endpoint might be a server in the data center, and another endpoint might be another server in the same data center or a gateway to a public communications network such as the Internet. To distribute traffic across the network and avoid congestion, there are typically multiple paths, or routes, data packets can be routed along from one endpoint to another.

One existing network load balancing scheme is Equal Cost Multi-Path (ECMP) load balancing, ECMP uses a hash function to specify which data path a data packet is to be routed along, based on header information of the data packet. An example of a simple hash function sums values corresponding to a packet header's settings for source port, destination port, source Internet Protocol (IP) address, and destination IP address) and then applies the modulo operation to determine a number identifying a particular path, where the modulo is based on the number of available paths. Another example of a simple hash function sums values corresponding to a packet header's settings for components of a 5-tuple (source port, destination port, source Internet Protocol (IP) address, destination IP address, and protocol) and then applies the modulo operation to determine a number identifying a particular path, where the modulo is based on the number of available paths. Protocol here refers to a data communication protocol such as Transmission Control Protocol (TCP), User Datagram Protocol (UDP), and the like. Other hash functions, using values of more, fewer, or different fields in a packet header, are also possible. Each router in the network has a copy of a path table informing the router which next hop corresponds to which path number. If the number of available paths changes (e.g., a router fails or a new router is added to the network), the hash function and router tables are updated. ECMP hashing is designed to enable load balancing and ensure uniform distribution of traffic across all available paths, and is particularly beneficial when dealing with many data flows. Other network load balancing schemes require a particular router to select a next hop, based on local traffic information. For example, if a router can send traffic to three next-hop routers, the originating router might send traffic to the next-hop router that is currently least-congested.

SUMMARY

The illustrative embodiments provide for adaptive endpoint-to-endpoint data path selection for data centers. An embodiment includes selecting, at a first network endpoint, using performance data of a plurality of paths, a first path in the plurality of paths, each of the plurality of paths comprising a data communication path from the first network endpoint through a subset of a plurality of network elements in a data communication network to a second network endpoint. An embodiment includes adjusting, at the first network endpoint, a packet header of a data packet, the adjusting resulting in an adjusted data packet header of an adjusted data packet, wherein a parameter setting in the adjusted data packet header causes a first network element in the data communication network to forward the adjusted data packet to a next network element in the data communication network along the first path. An embodiment includes sending, from the first network endpoint, the adjusted data packet, wherein the adjusted data packet causes a first subset of the plurality of network elements in the data communication network to forward the adjusted data packet to the second network endpoint along the first path. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 1 depicts a block diagram of a computing environment in accordance with an illustrative embodiment;

FIG. 2 depicts a flowchart of an example process for loading of process software in accordance with an illustrative embodiment;

FIG. 5 depicts a continued example of adaptive endpoint-to-endpoint data path selection for data centers in accordance with an illustrative embodiment;

FIG. 6 depicts a continued example of adaptive endpoint-to-endpoint data path selection for data centers in accordance with an illustrative embodiment.

DETAILED DESCRIPTION

Figure 3:
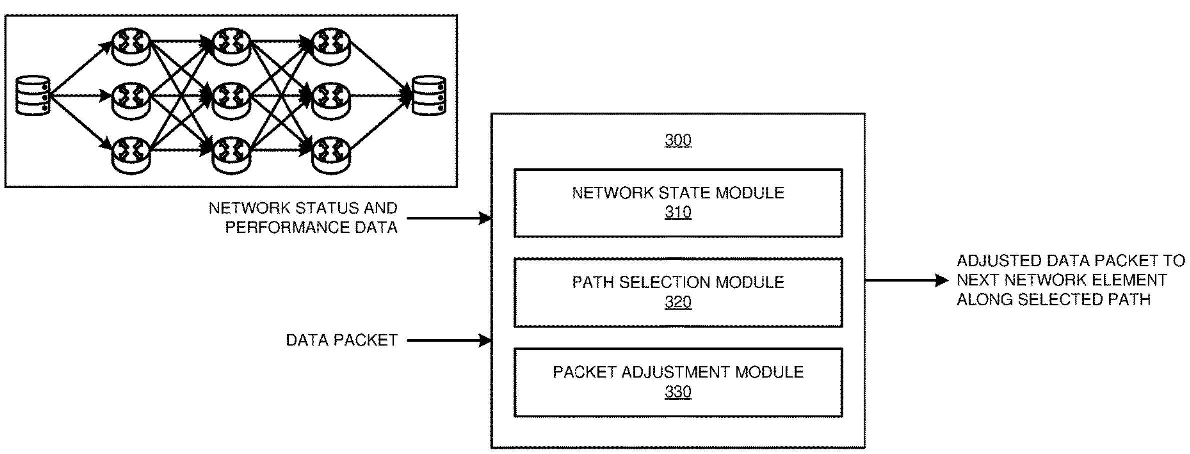
FIG. 3 depicts a block diagram of an example configuration for adaptive endpoint-to-endpoint data path selection for data centers in accordance with an illustrative embodiment.

The illustrative embodiments recognize that existing network load balancing schemes, including ECMP, were designed to distribute many average-sized dataflows across a network. However, such existing schemes do not work as well when faced with a few much-larger-than-average dataflows (e.g., 25 gigabits per second, typically used when training a machine learning model). A load balancing scheme that is unaware of particular areas of network congestion (e.g., if two paths through a network converge on the same router, overloading that particular router) can result in packet drops, packet delays, network performance degradation, and inefficient network utilization. Thus, the illustrative embodiments recognize that there is an unmet need to improve network path selection from one network endpoint to another.

The present disclosure addresses the deficiencies described above by providing a process (as well as a system, method, machine-readable medium, etc.) that using performance data of a plurality of paths in a data communication network, selects a first endpoint-to-endpoint path in the plurality of paths; adjusts, at the first network endpoint, a packet header of a data packet to cause a first network element in the data communication network to forward the adjusted data packet to a next network element along the first path; and sends the adjusted data packet from the first network endpoint to the second network endpoint along the first path. Thus, the illustrative embodiments provide for adaptive endpoint-to-endpoint data path selection for data centers.

An illustrative embodiment, executing in an endpoint of a data communication network in a data center, collects or measures performance data on paths within the data communication network. Each path is a data communication path from a first network endpoint through a subset of a plurality of network elements in a data communication network to a second network endpoint. Some non-limiting examples of the performance data collected are the available and total bandwidth of a path, the most recent measurement of round trip time of a packet on the path (i.e., the amount of time it takes for packet to be sent plus the amount of time it takes for acknowledgement of that packet to be received), an average of recent measurements of round trip time of a packet on the path, a rate of dropped packets on a path or by a router on a path, and whether a path congestion alert mechanism is currently set. One example of a path congestion alert mechanism is Explicit Congestion Notification (ECN), an extension to the Internet Protocol and to the Transmission Control Protocol that allows end-to-end notification of network congestion without dropping packets, by having an ECN-aware router set a mark in a data packet's header instead of dropping a packet in order to signal impending congestion. The receiver of the packet echoes the congestion indication to the sender, which reduces its transmission rate as if it had detected a dropped packet.

One embodiment collects data on paths within the data communication network by sending data packets from the starting endpoint to another endpoint within the network, and measuring performance data of the packets as the packets are transmitted from one router to another along paths in the network. One embodiment, in a network using ECMP, uses its knowledge of the hash function being used to ensure that the data packets sent to measure performance data travel on particular paths within the network, by setting one or more parameters in a header of a data packet such that the hash function, given those parameters as an input, will select a particular path on which the packet will travel. Another embodiment, in a network using Multi-Protocol Label Switching (MPLS) routing or a similar presently available routing scheme, sets a path label in an MPLS packet header encapsulating a data packet in another format. MPLS is a routing technique in telecommunications networks that directs data from one node to the next based on labels identifying established paths between endpoints rather than network addresses identifying only endpoints. MPLS encapsulates existing packets of various presently available network protocols, such as IP. Another embodiment extracts path performance data from a network performance monitoring application. Another embodiment uses another presently available method to measure or collect performance data on paths within the data communication network.

An embodiment, executing at a first network endpoint, checks whether path optimization is needed or requested for a particular data flow. One embodiment turns path optimization on for particular types of data flows, for example a remote direct memory access (RDMA) flow. RDMA is a direct memory access from the memory of one computer into that of another without involving either one's operating system, and can be implemented using presently available protocols such as RDMA over Converged Ethernet (ROCE) or InfiniBand over Ethernet (IBoE). If path optimization is needed or requested, an embodiment uses performance data of paths through the network to select a path for a data flow. In particular, one embodiment uses the path state derived from path performance data, using one or more flow parameters (e.g., the flow size) and one or more path parameters (e.g., round trip time and bandwidth) to select a path with sufficient capacity for a particular flow or to select the best-performing path for a particular flow.

To select a path for a data packet, an embodiment, executing at a first network endpoint, adjusts a parameter setting in a packet header of the data packet. The adjusted parameter setting causes a first network element in the data communication network to forward the adjusted data packet to a next network element in the data communication network along the selected path. One embodiment, with knowledge of the ECMP hash function and path table, adjusts a parameter setting that is an input to the ECMP hash function, so as to cause the result of the ECMP hash function to indicate the selected path. For example, using a simple hash function that sums the values of 5-tuple components (e.g., source port, destination port, source IP address, and destination IP address) and then applies the modulo operation to determine a number identifying a particular path, where the modulo is based on the number of available paths, an embodiment adjusts a parameter setting that is an input to the ECMP hash function (i.e., one of the source port, destination port, source IP address, and destination IP address), so as to cause the result of the ECMP hash function to indicate the selected path. For example, if the source port is set to 10, the source IP is 0.0.0.4, the destination port is 9, and the destination IP is 0.0.0.5, and there are 27 total paths, the hash function computes (10+4+9+5) modulo 27, resulting in 1, indicating that path number 1 is to be used when routing this packet through the network. Another embodiment adjusts a parameter setting—e.g., a packet path label—as implemented in MPLS routing or a similar presently available routing scheme. Other techniques for adjusted parameter settings causing network elements to forward a data packet along a selected path are also possible and contemplated within the scope of the illustrative embodiments.

An embodiment sends the adjusted data packet from the first network endpoint to a next network element in the data communication network along the selected path. The next network element, referencing the adjusted data packet, forwards the adjusted data packet to another network element (if the selected path includes another network element), and so on until the adjusted data packet arrives at a destination network endpoint along the selected path.

An embodiment updates performance data on paths within the data communication network, based on the existence or performance of a current or recently concluded data flow along a selected path. For example, if an embodiment has selected one path through a network for a currently executing data flow, and a second data flow requires path optimization, an embodiment might select a second path for the second data flow that does not use the same routers as the first path, to ensure that both data flows receive as much bandwidth as possible. As another example, if a data flow along a selected path has recently completed execution, an embodiment knows that the selected path provides sufficient performance for a similarly sized data flow, and hence might select the selected path for a second, similarly sized, data flow.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as an improved network management module 200 implementing adaptive endpoint-to-endpoint data path selection for data centers. In addition to block 200, computing environment 100 includes, for example, computer 101, wide area network (WAN) 102, end user device (EUD) 103, remote server 104, public cloud 105, and private cloud 106. In this embodiment, computer

101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

With reference to FIG. 2, this figure depicts a flowchart of an example process for loading of process software in accordance with an illustrative embodiment. The flowchart can be executed by a device such as computer 101, end user device 103, remote server 104, or a device in private cloud 106 or public cloud 105 in FIG. 1.

While it is understood that the process software implementing adaptive endpoint-to-endpoint data path selection for data centers may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 202 begins the deployment of the process software. An initial step is to determine if there are any programs that will reside on a server or servers when the process software is executed (203). If this is the case, then the servers that will contain the executables are identified (229). The process software for the server or servers is transferred directly to the servers' storage via FTP or some other protocol or by copying though the use of a shared file system (230). The process software is then installed on the servers (231).

Next, a determination is made on whether the process software is to be deployed by having users access the process software on a server or servers (204). If the users are to access the process software on servers, then the server addresses that will store the process software are identified (205).

A determination is made if a proxy server is to be built (220) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (221). The process software is sent to the (one or more) servers either via a protocol such as FTP, or it is copied directly from the source files to the server files via file sharing (222). Another embodiment involves sending a transaction to the (one or more) servers that contained the process software, and have the server process the transaction and then receive and copy the process software to the server's file system. Once the process software is stored at the servers, the users via their client computers then access the process software on the servers and copy to their client computers file systems (223). Another embodiment is to have the servers automatically copy the process software to each client and then run the installation program for the process software at each client computer. The user executes the program that installs the process software on his client computer (232) and then exits the process (210).

In step 206 a determination is made whether the process software is to be deployed by sending the process software to users via e-mail. The set of users where the process software will be deployed are identified together with the addresses of the user client computers (207). The process software is sent via e-mail to each of the users' client computers (224). The users then receive the e-mail (225) and then detach the process software from the e-mail to a directory on their client computers (226). The user executes the program that installs the process software on his client computer (232) and then exits the process (210).

Lastly, a determination is made on whether the process software will be sent directly to user directories on their client computers (208). If so, the user directories are identified (209). The process software is transferred directly to the user's client computer directory (227). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (228). The user executes the program that installs the process software on his client computer (232) and then exits the process (210).

With reference to FIG. 3, this figure depicts a block diagram of an example configuration for adaptive endpoint-to-endpoint data path selection for data centers in accordance with an illustrative embodiment. Application 300 is the same as application 200 in FIG. 1.

In an illustrative embodiment, executing in an endpoint of a data communication network in a data center, network state module 310 collects or measures performance data on paths within the data communication network. Each path is a data communication path from a first network endpoint through a subset of a plurality of network elements in a data communication network to a second network endpoint. Some non-limiting examples of the performance data collected are the available and total bandwidth of a path, the most recent measurement of round trip time of a packet on the path (i.e., the amount of time it takes for packet to be sent plus the amount of time it takes for acknowledgement of that packet to be received), an average of recent measurements of round trip time of a packet on the path, a rate of dropped packets on a path or by a router on a path, and whether a path congestion alert mechanism is currently set. One example of a path congestion alert mechanism is Explicit Congestion Notification (ECN), an extension to the Internet Protocol and to the Transmission Control Protocol that allows end-to-end notification of network congestion without dropping packets, by having an ECN-aware router set a mark in a data packet's header instead of dropping a packet in order to signal impending congestion. The receiver of the packet echoes the congestion indication to the sender, which reduces its transmission rate as if it had detected a dropped packet.

One implementation of module 310 collects data on paths within the data communication network by sending data packets from the starting endpoint to another endpoint within the network, and measuring performance data of the packets as the packets are transmitted from one router to another along paths in the network. One implementation of module 310, in a network using ECMP, uses its knowledge of the hash function being used to ensure that the data packets sent to measure performance data travel on particular paths within the network, by setting one or more parameters in a header of a data packet such that the hash function, given those parameters as an input, will select a particular path on which the packet will travel. Another implementation of module 310, in a network using MPLS routing or a similar presently available routing scheme, sets a path label in an MPLS packet header encapsulating a data packet in another format. Another implementation of module 310 extracts path performance data from a network performance monitoring application. Another implementation of module 310 uses another presently available method to measure or collect performance data on paths within the data communication network.

Path selection module 320, executing at a first network endpoint, checks whether path optimization is needed or requested for a particular data flow. If path optimization is needed or requested, module 320 uses performance data of paths through the network to select a path for a data flow. In particular, one implementation of module 320 uses the path state derived from path performance data, using one or more flow parameters (e.g., the flow size) and one or more path parameters (e.g., round trip time and bandwidth) to select a path with sufficient capacity for a particular flow or to select the best-performing path for a particular flow.

To select a path for a data packet, packet adjustment module 330, executing at a first network endpoint, adjusts a parameter setting in a packet header of the data packet. The adjusted parameter setting causes a first network element in the data communication network to forward the adjusted data packet to a next network element in the data communication network along the selected path. One implementation of module 330, with knowledge of the ECMP hash function and path table, adjusts a parameter setting that is an input to the ECMP hash function, so as to cause the result of the ECMP hash function to indicate the selected path. For example, using a simple hash function that sums the values of 5-tuple components (e.g., source port, destination port, source IP address, and destination IP address) and then applies the modulo operation to determine a number identifying a particular path, where the modulo is based on the number of available paths, one implementation of module 330 adjusts a parameter setting that is an input to the ECMP hash function (i.e., one of the source port, destination port, source IP address, and destination IP address), so as to cause the result of the ECMP hash function to indicate the selected path. For example, if the source port is set to 10, the source IP is 0.0.0.4, the destination port is 9, and the destination IP is 0.0.0.5, and there are 27 total paths, the hash function computes (10+4+9+5) modulo 27, resulting in 1, indicating that path number 1 is to be used when routing this packet through the network. Another implementation of module 330 adjusts a parameter setting—e.g., a packet path label—as implemented in MPLS routing or a similar presently available routing scheme. Other techniques for adjusted parameter settings causing network elements to forward a data packet along a selected path are also possible.

Application 300 sends the adjusted data packet from the first network endpoint to a next network element in the data communication network along the selected path. The next network element, referencing the adjusted data packet, forwards the adjusted data packet to another network element (if the selected path includes another network element), and so on until the adjusted data packet arrives at a destination network endpoint along the selected path.

Application 300 updates performance data on paths within the data communication network, based on the existence or performance of a current or recently concluded data flow along a selected path. For example, if application 300 has selected one path through a network for a currently executing data flow, and a second data flow requires path optimization, application 300 might select a second path for the second data flow that does not use the same routers as the first path, to ensure that both data flows receive as much bandwidth as possible. As another example, if a data flow along a selected path has recently completed execution, application 300 knows that the selected path provides sufficient performance for a similarly sized data flow, and hence might select the selected path for a second, similarly sized, data flow.

Figure 4:
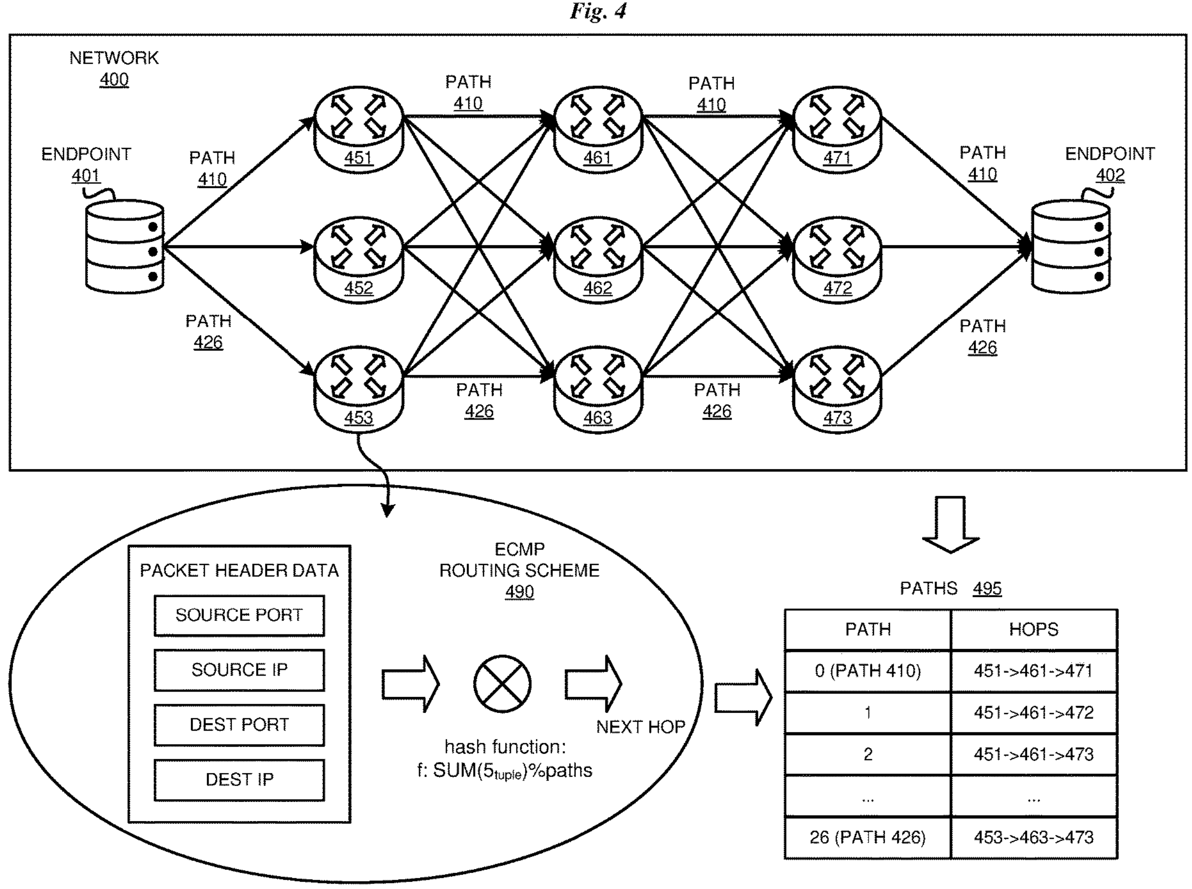
FIG. 4 depicts an example of adaptive endpoint-to-endpoint data path selection for data centers in accordance with an illustrative embodiment.

With reference to FIG. 4, this figure depicts an example of adaptive endpoint-to-endpoint data path selection for data centers in accordance with an illustrative embodiment. The example can be executed using application 300 in FIG. 3.

As depicted, network 400 is a data communication network in a data center. Network 400 includes endpoints 401 and 402, along with network elements (e.g., routers) 451, 452, 453, 461, 462, 463, 471, 472, and 473. Paths 410 and 426 are example paths through network 400 from endpoint 401 to endpoint 402. Note that network 400 is only a simplified example, for use in illustrating concepts, and most implemented networks include more endpoints, components, and possible paths. For example, one typical network configuration might have on the order of one thousand possible paths.

ECMP routing scheme 490 depicts a simple hash function that sums the values of 5-tuple components (e.g., source port, destination port, source IP address, and destination IP address) and then applies the modulo operation to determine a number identifying a particular path, where the modulo is based on the number of available paths (here, 27, numbered from 0-26). Some of the possible paths are depicted in paths 495, including paths 410 and 426.

With reference to FIG. 5, this figure depicts a continued example of adaptive endpoint-to-endpoint data path selection for data centers in accordance with an illustrative embodiment. Network 400, endpoints 401 and 402, and network elements 451, 452, 453, 461, 462, 463, 471, 472, and 473, and paths 495 are the same as network 400, endpoints 401 and 402, and network elements 451, 452, 453, 461, 462, 463, 471, 472, and 473, and paths 495 in FIG. 4.

Packet header 512 depicts a packet header of a data packet in data flow 510 from endpoint 401 to endpoint 402. Using the hash function of ECMP routing scheme 490, packet header 512 will be routed along path number 12. Packet header 522 depicts a packet header of a data packet in data flow 520 from endpoint 401 to endpoint 402. Using the hash function of ECMP routing scheme 490, packet header 522 will be routed along path number 4. Because paths 12 and 4 both pass through network element 462, collision 530 occurs. If data flows 510 and 520 are sufficiently large, network element 462 could be overloaded, causing dropped packets or performance degradation.

With reference to FIG. 6, this figure depicts a continued example of adaptive endpoint-to-endpoint data path selection for data centers in accordance with an illustrative embodiment. Network 400, endpoints 401 and 402, and network elements 451, 452, 453, 461, 462, 463, 471, 472, and 473, and paths 495 are the same as network 400, endpoints 401 and 402, and network elements 451, 452, 453, 461, 462, 463, 471, 472, and 473, and paths 495 in FIG. 4. Flow 510 and packet header 512 are the same as flow 510 and packet header 512 in FIG. 5.

Here, packet header 512 is again routed along path number 12. Adjusted packet header 622 depicts an adjusted packet header of a data packet in data flow 620 from endpoint 401 to endpoint 402. In particular, packet header 622 has been adjusted using adjustment 621, changing the destination port number so that, using the hash function of ECMP routing scheme 490, packet header 622 will be routed along path number 1 instead of path number 4, avoiding network element 462. Thus, result 630 occurs-collision 530 is avoided.

Figure 7:
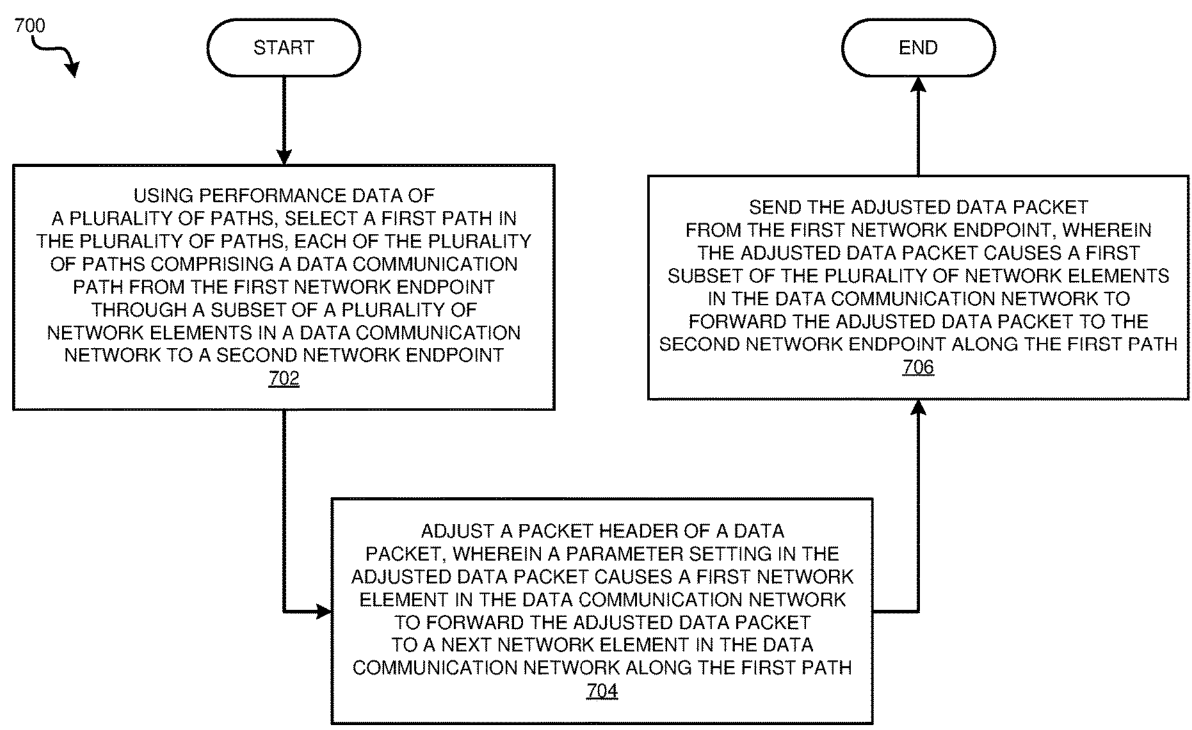
FIG. 7 depicts a flowchart of an example process for adaptive endpoint-to-endpoint data path selection for data centers in accordance with an illustrative embodiment.

With reference to FIG. 7, this figure depicts a flowchart of an example process for adaptive endpoint-to-endpoint data path selection for data centers in accordance with an illustrative embodiment. Process 700 can be implemented in application 300 in FIG. 3.

In the illustrated embodiment, at block 702, the process, using performance data of a plurality of paths, selects a first path in the plurality of paths, each of the plurality of paths comprising a data communication path from the first network endpoint through a subset of a plurality of network elements in a data communication network to a second network endpoint. At block 704, the process adjusts a packet header of a data packet, wherein a parameter setting in the adjusted data packet causes a first network element in the data communication network to forward the adjusted data packet to a next network element in the data communication network along the first path. At block 706, the process sends the adjusted data packet from the first network endpoint, wherein the adjusted data packet causes a first subset of the plurality of network elements in the data communication network to forward the adjusted data packet to the second network endpoint along the first path. Then the process ends.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:

selecting, at a first network endpoint, using performance data of a plurality of paths, a first path in the plurality of paths, each of the plurality of paths comprising a data communication path from the first network endpoint through a subset of a plurality of network elements in a data communication network to a second network endpoint;

adjusting, at the first network endpoint, a packet header of a data packet of a first data flow, the adjusting resulting in an adjusted data packet header of an adjusted data packet, wherein a parameter setting, that is an output of an Equal Cost Multi-Path (ECMP) hash function identifying the first path, in the adjusted data packet header causes a first network element in the data communication network to forward the adjusted data packet to a next network element in the data communication network along the first path;

sending, from the first network endpoint, the adjusted data packet of the first data flow, wherein the adjusted data packet causes a first subset of the plurality of network elements in the data communication network to forward the adjusted data packet to the second network endpoint along the first path; and determining a size comparison between a size of the first data flow with a size of a second data flow, adjusting a second data flow data packet header of a data packet of the second data flow, the adjusting resulting in an adjusted second data flow data packet header of an adjusted second data flow data packet causing the first network element in the data communication network to forward the adjusted second data flow data packet to the next network element in the data communication network along the first path as one taken by the first data flow based on the size comparison wherein an ECMP output adjusts a next network element in the adjusted second data flow data packet header, wherein the next network element is different from at least one network element used by a data flow data packet of a currently executing data flow.

2. The computer-implemented method of claim 1, further comprising:

measuring, at the first network endpoint, the performance data of the plurality of paths comprising measuring the performance data of a network element of the first subset of the plurality of network elements used by an executing data flow data packet of a currently executing data flow of the first path, responsive to the measuring replacing a parameter setting in the adjusted second data flow data packet header and forwarding the adjusted second data flow data packet along the first path based on the size comparison below a similarity threshold wherein the forwarding avoids the network element used by the executing data flow data packet.

3. The computer-implemented method of claim 2, wherein measuring the performance data of the plurality of paths further comprises:

selecting, at the first network endpoint, a test path in the plurality of paths;

adjusting, at the first network endpoint, a packet header of a test data packet, the adjusting resulting in an adjusted test data packet header, wherein a parameter setting in the adjusted test data packet header causes the first network element in the data communication network to forward the adjusted test data packet to the next network element in the data communication network along the test path;

sending, from the first network endpoint, the adjusted test data packet; and measuring, at the first network endpoint, performance data of the sending of the test data packet along the test path.

4. The computer-implemented method of claim 1, wherein the performance data of the plurality of paths comprises a measurement of a round trip time of a packet along a path in the plurality of paths.

5. The computer-implemented method of claim 1, wherein the parameter setting in the adjusted data packet header is an input to an Equal Cost Multi-Path (ECMP) hash function, wherein a modulo operation on the input results in an output of the ECMP hash function identifying the first path.

6. The computer-implemented method of claim 1, wherein the parameter setting in the adjusted data packet header is a packet path label in Multi-Protocol Label Switching (MPLS) routing.

7. A computer program product comprising one or more computer readable storage media, and program instructions collectively stored on the one or more computer readable storage media, the program instructions executable by a processor to cause the processor to perform operations comprising:

selecting, at a first network endpoint, using performance data of a plurality of paths, a first path in the plurality of paths, each of the plurality of paths comprising a data communication path from the first network endpoint through a subset of a plurality of network elements in a data communication network to a second network endpoint;

adjusting, at the first network endpoint, a packet header of a data packet of a first data flow, the adjusting resulting in an adjusted data packet header of an adjusted data packet, wherein a parameter setting, that is an output of an Equal Cost Multi-Path (ECMP) hash function identifying the first path, in the adjusted data packet header causes a first network element in the data communication network to forward the adjusted data packet to a next network element in the data communication network along the first path;

sending, from the first network endpoint, the adjusted data packet of the first data flow, wherein the adjusted data packet causes a first subset of the plurality of network elements in the data communication network to forward the adjusted data packet to the second network endpoint along the first path; and determining a size comparison between a size of the first data flow with a size of a second data flow, adjusting a second data flow data packet header of a data packet of the second data flow, the adjusting resulting in an adjusted second data flow data packet header of an adjusted second data flow data packet causing the first network element in the data communication network to forward the adjusted second data flow data packet to the next network element in the data communication network along the first path as one taken by the first data flow based on the size comparison wherein an ECMP output adjusts a next network element in the adjusted second data flow data packet header, wherein the next network element is different from at least one network element used by a data flow data packet of a currently executing data flow.

8. The computer program product of claim 7, wherein the stored program instructions are stored in a computer readable storage device in a data processing system, and wherein the stored program instructions are transferred over a network from a remote data processing system.

9. The computer program product of claim 7, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

10. The computer program product of claim 7, further comprising:

measuring, at the first network endpoint, the performance data of the plurality of paths comprising measuring the performance data of a network element of the first subset of the plurality of network elements used by an executing data flow data packet of a currently executing data flow of the first path, responsive to the measuring replacing a parameter setting in the adjusted second data flow data packet header and forwarding the adjusted second data flow data packet along the first path based on the size comparison below a similarity threshold wherein the forwarding avoids the network element used by the executing data flow data packet.

11. The computer program product of claim 10, wherein measuring the performance data of the plurality of paths further comprises:

selecting, at the first network endpoint, a test path in the plurality of paths;

adjusting, at the first network endpoint, a packet header of a test data packet, the adjusting resulting in an adjusted test data packet header, wherein a parameter setting in the adjusted test data packet header causes the first network element in the data communication network to forward the adjusted test data packet to the next network element in the data communication network along the test path;

sending, from the first network endpoint, the adjusted test data packet; and measuring, at the first network endpoint, performance data of the sending of the test data packet along the test path.

12. The computer program product of claim 7, wherein the performance data of the plurality of paths comprises a measurement of a round trip time of a packet along a path in the plurality of paths.

13. The computer program product of claim 7, wherein the parameter setting in the adjusted data packet header is an input to an Equal Cost Multi-Path (ECMP) hash function, wherein a modulo operation on the input results in an output of the ECMP hash function identifying the first path.

14. The computer program product of claim 7, wherein the parameter setting in the adjusted data packet header is a packet path label in Multi-Protocol Label Switching (MPLS) routing.

15. A computer system comprising a processor and one or more computer readable storage media, and program instructions collectively stored on the one or more computer readable storage media, the program instructions executable by the processor to cause the processor to perform operations comprising:

selecting, at a first network endpoint, using performance data of a plurality of paths, a first path in the plurality of paths, each of the plurality of paths comprising a data communication path from the first network endpoint through a subset of a plurality of network elements in a data communication network to a second network endpoint;

adjusting, at the first network endpoint, a packet header of a data packet of a first data flow, the adjusting resulting in an adjusted data packet header of an adjusted data packet, wherein a parameter setting, that is an output of an Equal Cost Multi-Path (ECMP) hash function identifying the first path, in the adjusted data packet header causes a first network element in the data communication network to forward the adjusted data packet to a next network element in the data communication network along the first path;

sending, from the first network endpoint, the adjusted data packet of the first data flow, wherein the adjusted data packet causes a first subset of the plurality of network elements in the data communication network to forward the adjusted data packet to the second network endpoint along the first path; and determining a size comparison between a size of the first data flow with a size of a second data flow, adjusting a second data flow data packet header of a data packet of the second data flow, the adjusting resulting in an adjusted second data flow data packet header of an adjusted second data flow data packet causing the first network element in the data communication network to forward the adjusted second data flow data packet to the next network element in the data communication network along the first path as one taken by the first data flow based on the size comparison wherein an ECMP output adjusts a next network element in the adjusted second data flow data packet header, wherein the next network element is different from at least one network element used by a data flow data packet of a currently executing data flow.

16. The computer system of claim 15, further comprising:

measuring, at the first network endpoint, the performance data of the plurality of paths comprising measuring the performance data of a network element of the first subset of the plurality of network elements used by an executing data flow data packet of a currently executing data flow of the first path, responsive to the measuring replacing a parameter setting in the adjusted second data flow data packet header and forwarding the adjusted second data flow data packet along the first path based on the size comparison below a similarity threshold wherein the forwarding avoids the network element used by the executing data flow data packet.

17. The computer system of claim 16, wherein measuring the performance data of the plurality of paths further comprises:

selecting, at the first network endpoint, a test path in the plurality of paths;

adjusting, at the first network endpoint, a packet header of a test data packet, the adjusting resulting in an adjusted test data packet header, wherein a parameter setting in the adjusted test data packet header causes the first network element in the data communication network to forward the adjusted test data packet to the next network element in the data communication network along the test path;

sending, from the first network endpoint, the adjusted test data packet; and measuring, at the first network endpoint, performance data of the sending of the test data packet along the test path.

18. The computer system of claim 15, wherein the performance data of the plurality of paths comprises a measurement of a round trip time of a packet along a path in the plurality of paths.

19. The computer system of claim 15, wherein the parameter setting in the adjusted data packet header is an input to an Equal Cost Multi-Path (ECMP) hash function, wherein a modulo operation on the input results in an output of the ECMP hash function identifying the first path.

20. The computer system of claim 15, wherein the parameter setting in the adjusted data packet header is a packet path label in Multi-Protocol Label Switching (MPLS) routing.

* * * * *